United States Patent [19]
Stratynski

[11] 3,929,314
[45] Dec. 30, 1975

[54] ACTUATING MEANS FOR A BUTTERFLY VALVE

[75] Inventor: Eugene Edward Stratynski, West Chicago, Ill.

[73] Assignee: Eaton Corporation, Ohio

[22] Filed: June 8, 1973

[21] Appl. No.: 368,386

[52] U.S. Cl. ................ 251/58; 251/78; 251/305
[51] Int. Cl.² ...................................... F16K 31/165
[58] Field of Search ....... 251/294, 305, 58, 78, 298, 251/61; 123/108, 127, 117 A; 74/470; 64/15 B

[56] References Cited
UNITED STATES PATENTS

| | | | |
|---|---|---|---|
| 1,549,109 | 8/1925 | Goetz | 251/294 |
| 2,815,173 | 12/1957 | Drapeau et al. | 251/305 X |
| 2,827,078 | 3/1958 | Zies | 251/78 X |
| 3,421,732 | 1/1969 | Golden | 251/58 |
| 3,568,975 | 3/1971 | Obermaier | 251/58 |
| 3,623,696 | 11/1971 | Baumann | 251/298 X |
| 3,788,290 | 1/1974 | Carter | 123/117 A |
| 3,796,408 | 3/1974 | Sheppard | 251/58 |

*Primary Examiner*—Arnold Rosenthal
*Attorney, Agent, or Firm*—John R. Dwelle

[57] ABSTRACT

A butterfly valve is provided with an especially formed actuating link to improve valve life and operational characteristics. The valve includes a valve body having a butterfly plate therein to control the flow of fluid therethrough and a vacuum actuator secured to the body having a plunger extending therefrom. The plunger is connected with the butterfly plate by an especially preformed, U-shaped actuating link which permits overtravel of the vacuum actuator to occur without transmitting an excessive biasing force to the butterfly plate.

6 Claims, 5 Drawing Figures

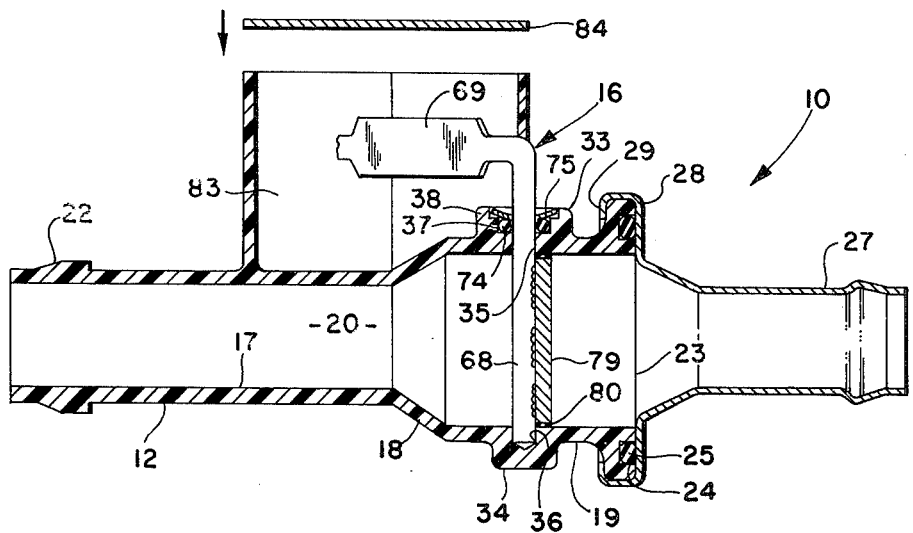
_Fig. 3_
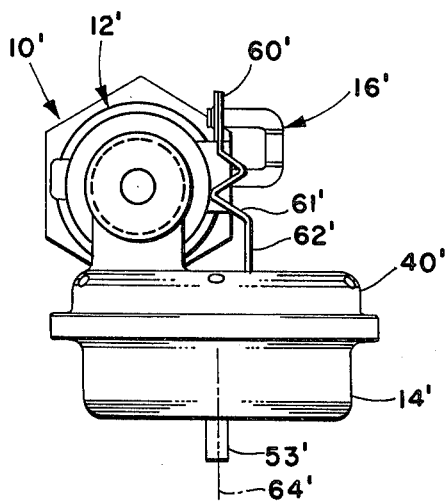

ACTUATING MEANS FOR A BUTTERFLY VALVE

This invention relates generally to valves of the butterfly type and, more particularly, to an improved means for actuating same.

The invention is particularly applicable to a vacuum-operated butterfly valve employed in an automotive vehicle for regulating the flow of water to a heater core therein and will be described with particular reference thereto. However it will be appreciated by those skilled in the art that the invention may have broader applications and may be employed with any type of butterfly valve utilizing any form of valve actuator such as a solenoid, a thermally-responsive element, etc.

Heretofore, butterfly valves used to control coolant flow to the heater core in an automotive vehicle comprised a vacuum motor with a plunger extending therefrom which was secured to a valve body employing the usual butterfly plate arrangement therein. A rigid actuating link, essentially formed as a U-shaped member, connected the diaphragm plunger with the butterfly plate to transmit linear motion of the plunger into rotary motion of the butterfly plate whereby coolant flow through the valve was controlled. Because the link was rigid, overtravel of the plunger forced the butterfly plate to rotate further in the valve chamber so that the resilient sealing material about the butterfly plate is excessively wedged within the valve chamber. This caused excessive wear of the resilient-sealing material and in turn promoted leakage of the valve after some period of use. Because some overtravel must be designed into the valve as a result of variations in source or manifold vacuum, the tolerance assembly of the valve becomes critical and valve cost correspondingly increases.

It is thus a principal object of the subject invention to provide an actuating link in a butterfly-type valve which increases the durability of the valve whereby leakage in a closed position to the valve is minimized even though the valve be extensively used.

In accordance with the invention, this object is achieved by providing a vacuum-operated valve comprising a valve body and a valve actuator secured to the valve body and having a movable plunger extending therefrom. The valve body defines an open-ended, longitudinally-extending chamber therein which receives a rotatable butterfly plate for controlling the flow of fluid therethrough. A preformed, generally U-shaped actuating link having a first segment affixed to the butterfly plate, a third segment pinned at its end to the plunger and an intermediate, resilient second segment perpendicular to the first and third segments provides means for transmitting linear motion of the plunger to rotary motion of the plate. The second segment is further defined as being generally flat and rectangular in cross section in contradistinction to the rest of the actuating link which is circular in cross section. The intermediate section acts as a leaf spring upon overtravel of the vacuum actuator to prevent the actuator from transmitting an excessive biasing force to the butterfly plate while yet possessing sufficient rigidity to actuate the butterfly plate.

In accordance with another aspect of the invention the actuator plunger may be resiliently preformed so as to yieldably deflect along with the resilient link upon overtravel of the actuator. This is accomplished by defining the plunger as having first, second, and third contiguous portions with the first and third portions offset and generally parallel with one another. The second intermediate connecting portion will thus react as a resilient member upon overtravel of the vacuum motor.

It is thus another object of the subject invention to provide a resilient valve actuator plunger either by itself or in combination with a resilient actuating link to improve performance of butterfly-type valves.

Still another object of the invention is to provide an improved actuating mechanism for a butterfly-type valve which resiliently deflects upon overtravel of the valve actuator thus permitting the valve to be easily calibrated.

Yet another object of the subject invention is to provide an improved actuating mechanism for use in a butterfly-type valve which permits the valve to be easily manufactured and assembled from parts which may have a greater range of tolerances than heretofore permissible.

The invention may take physical form in certain parts and arrangement of parts, preferred embodiments of which will be described in detail herein and illustrated in the accompanying drawings which form a part hereof and wherein:

FIG. 3 is a cross-sectional view of the valve of FIG. 1 taken alone Line 3—3;

FIG. 5 is an elevation view of a valve illustrating an alternative embodiment of the subject invention.

Figure 1:
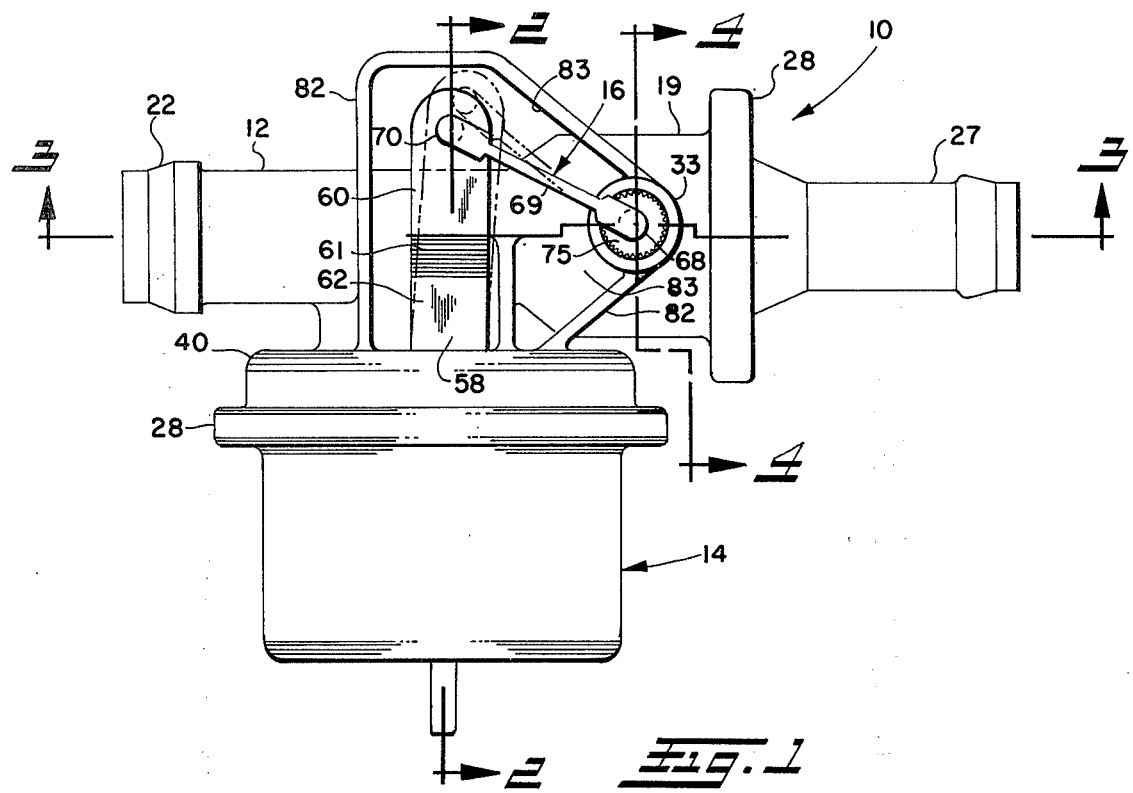
FIG. 1 is an elevation view of a valve employing the subject invention.

Referring now to the drawings wherein the showings are for the purpose of illustrating a preferred embodiment of the invention only and not for the purpose of limiting the same, there is shown in FIG. 1 a butterfly-type valve 10 which includes a valve body 12, a valve actuator 14 secured to the body and a preformed, generally U-shaped actuating link 16 extending from the valve body 12 to the valve actuator 14.

The valve body 12 shown (FIG. 3) is manufactured from plastic by an injection-molding process and has a stepped, generally-cylindrical configuration defined by a first cylindrical portion 17 which leads into the minor diameter of a frusto-conical portion 18 which in turn terminates at its major diameter with a second cylindrical portion 19. Valve body portions 17, 18, 19 define a similarly shaped, open-ended chamber extending therethrough which is indicated generally by reference number 20.

Because the butterfly valve illustrated is adapted to be inserted in an "in line" application, the end 22 of cylindrical valve body portion 17 is shown formed so as to be inserted within a hose (not shown) and sealing secured therein by a hose clamp (not shown). The opposite valve body end 23 is adapted to receive a hose-type fitting 27 similar in configuration to end 22 for insertion into a second heater hose (not shown).

Fitting 27 is affixed to end 23 in the customary manner known to those skilled in the art. That is, end 23 is defined as a radially-extending flange which has a circular sealing groove 24 therein to receive an O-ring seal 25. Fitting 27 likewise has a radially-extending flanged end 28 which abuts end 23 and is crimped inwardly about end 23 as at 29 to seal the fitting to the valve body. It will be appreciated by those skilled in the art that other types of fittings, such as a threaded fitting to be secured in the water jacket of the engine, may likewise be applied to valve body 12.

Figure 2:
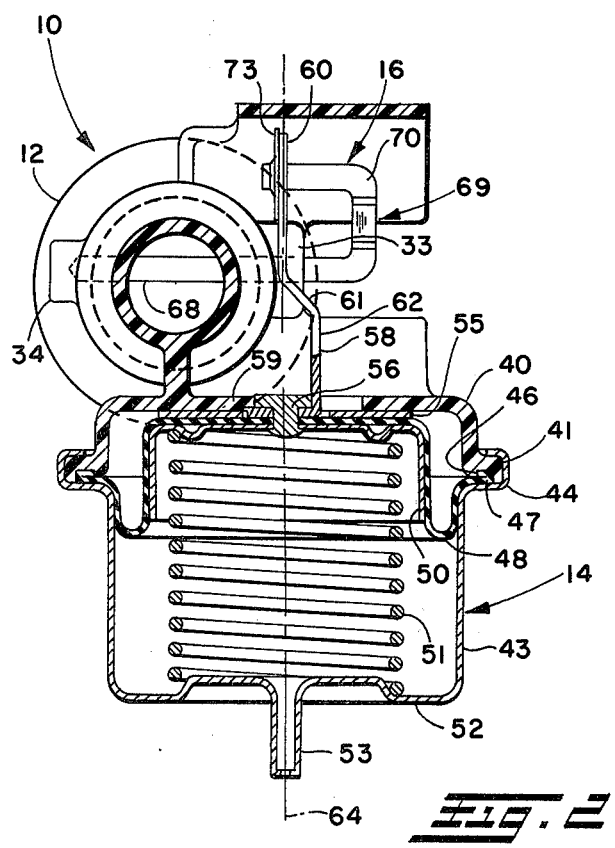
FIG. 2 is a cross-sectional view of the valve in FIG. 1 taken along Line 2—2 of FIG. 1.

Formed on one side of valve body 12 is an open-ended, cup-shaped casing 40 which has a radially-extending flanged end 41 remote from valve chamber 20 (FIG. 2). Cup-shaped casing 40 defines a first cylindrical casing section of the valve actuator 14 which is shown herein as a conventional type of vacuum motor. A second generally-cylindrical, cup-shaped casing 43 having a radially-extending flanged end 44 abuts flanged end 41 of the first cup-shaped casing 40. Within flanged end 41 is a circular sealing groove 46 which receives a formed, peripheral portion 47 of a diaphragm 48 therein and the radial flanged end 44 of the second casing section 43 is crimped about the radially-extending flanged end 41 of the first member in a conventional manner to seal the valve actuator 14.

Within casings 40, 43 is a cup-shaped reinforcement member 50 applied to the inside of diaphragm 48; diaphragm 48 being of sufficient area to conform about reinforcement member 50. Cup-shaped reinforcement member 50, in turn, serves as a seat for one end of a compression spring 51 with the other end of the spring seated against the closed end 52 of the second casing section 43 which has a vacuum outlet fitting 53 formed therein. Secured to the external side of diaphragm 48 is a circular diaphragm plate 55 which is maintained in tight engagement with diaphragm 48 and the reinforcement member 50 by a rivet 56 extending through the center thereof. Also secured to the diaphragm plate 55 by rivet 56 is an especially-configured plunger rod 58 which axially extends through an opening 59 in the first cup-shaped casing section 40.

As shown in FIGS. 1 and 2, plunger rod 58 is defined as having first, second, and third contiguous portions 60, 61, 62 with the first plunger portion 60 axially aligned with the centerline 64 of valve actuator 14. The third portion 62 which is secured to rivet 56 is shown as being laterally offset from and extending generally parallel to the first plunger portion 60 with the second or intermediate portion 61 connecting portions 60, 62 to one another in a somewhat resilient manner as will be explained hereafter.

Figure 4:
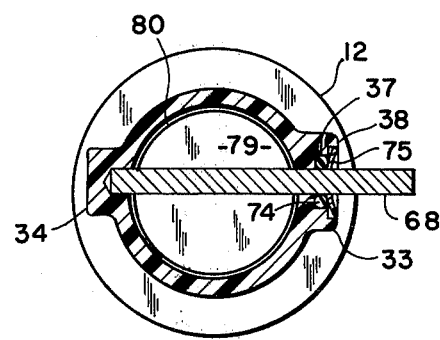
FIG. 4 is a cross-sectional view of the valve taken along Line 4—4 of FIG. 1.

Referring next to FIGS. 3 and 4, there is shown a pair of diametrically-opposed bosses 33, 34 formed in the second cylindrical portion 19 of valve body 12. A first bore 35 formed in boss 33 extends therethrough and a second bore 36 axially-aligned with bore 35 extends partly into boss 34. Bore 35 is further defined by first and second concentric stepped countersunk holes 37, 38 formed from the exterior of the valve body.

Received within bores 35, 36 so as to be journalled therein and extending outwardly from bore 35 is a portion of the actuating link 16 defined as the first segment 68. A seal 74 in the first countersunk hole 37 prevents leakage from the valve body chamber 20 through bore 35 and is maintained in a sealing position by a serrated spring disc 75 snapped into the second countersunk hole 38. Resistance welded to the first segment 68 of the actuating link within body chamber 20 is a butterfly plate 79 of known construction. More particularly a ring of resilient material 80 is secured to the peripheral edge of the butterfly plate 79 as by any conventional known method to prevent leakage of fluid through valve chamber 20 when plate 79 is in its closed position (FIG. 4).

As best shown in FIG. 2, the U-shaped actuating link 16 is further defined by a second resilient segment 69 depending at a right angle from the first portion 68 and a third segment 70 depending at a right angle from the second segment 69. The third segment 70 which includes a right angle bend portion of link 16 is secured to the first portion 60 of the plunger by a known, serrated-type fastener (not shown). The second link segment 69 is thus intermediate the first and third segments 68, 70 and importantly is shown as being relatively thin and generally rectangular in cross-sectional configuration to achieve its resiliency. More particularly second segment 69 is formed by simply flattening a round, circular bar which is then bent into the shape of the actuating link 16 as thus described. The cross-sectional area of the second segment 69 is thus equal to that of the first and third segments 68, 70.

To protect the actuating mechanism thus described, i.e., plunger rod 58 and formed link 16, a plurality of contiguous walls 82 are molded to extend from the outer surface of the valve body 12 to encircle the actuating mechanism (FIG. 3). Walls 82 thus define a second chamber 83 which encloses the actuating mechanism. A cover plate 84 is then applied to the open end of the second chamber 83 to seal same.

In operation, vacuum from a source, such as vacuum manifold from an automobile engine, will cause the diaphragm and accordingly the plunger rod 58 to be retracted into vacuum motor casing section 43. The position of the butterfly plate 79 with respect to the first segment 68 of the actuating link 16 can be located as to be either in a closed or open position upon actuation of the valve actuator 14. In FIG. 1, plunger rod 58 is shown in an unextended, "no vacuum" condition which for purposes of explanation will be assumed to be a closed position of the valve. Shown in dotted line fashion is the position that the link 16 (and plunger rod 58) could assume as a result of manufacturing tolerances in assembly (overtravel). Heretofore, the butterfly plate 79 would rotate further within valve chamber 20 to account for this difference in travel. This action would wedge the resilient material 80 of the butterfly plate 79 against valve body chamber 20 resulting in an increased rate of wear on the resilient material 80 of the butterfly plate which would cause premature leakage of same in a closed position. With the actuating mechanism of the present invention, plunger rod 58 will be able to assume the overtravel position shown primarily by deflection of the intermediate segment 69 of the actuating link 16 without placing undue stress in resilient material 80. Additionally some deflection may also be taken by the offset portion 61 of the plunger itself or if desired the entire deflection could be taken by plunger rod 58. In the event that the actuating mechanism may take a permanent set from such force, calibration of the butterfly valve 10 is not distorted because actuation of the valve actuator 14 will still result in an open position of the butterfly plate 79.

A similar analysis will hold when the butterfly plate 79 is secured to the actuating link 16 in such a manner as to be in a normally closed position under vacuum and in an open position when the vacuum is reduced which is the desired operation of such valve. Under this condition, downward travel of plunger rod 58 will rotate the butterfly plate into a closed position. Different variances in vacuum levels and/or assembly tolerances will cause overtravel which will tend to elongate the plunger rod 58 and/or deflect the actuating link 16.

An alternative embodiment of the subject invention is shown in FIG. 5 wherein like numbers designated by a prime (') indicate like parts where applicable. The valve actuating mechanism thus shown is identical to that previously described except that the intermediate plunger portion 61' is constructed in the form of sawtooth type teeth. This configuration provides for a greater degree of resiliency within the plunger in that the intermediate portion 61' will expand or contract in an accordion-like manner upon overtravel of actuator 14'.

Having thus described my invention, it is apparent that many modifications and alterations may be incorporated therein without departing from the spirit or essence of the invention. It is my intention to include all such modifications and alterations insofar as they come within the scope of the present invention.

It is thus the essence of my invention to provide an especially formed, valve actuating mechanism for butterfly-type valves which improve valve characteristics.

Having thus defined my invention, I claim:

1. A butterfly valve comprising:
   a. a valve actuator having a movable plunger extending therefrom;
   b. a valve body secured to said valve actuator, said valve body defining an open-ended, longitudinally-extending first chamber therein;
   c. a rotatable butterfly plate within said chamber for controlling flow of fluid therein; and
   d. a preformed, generally U-shaped actuating link connecting said plunger with said plate, said link having a first segment affixed to said plate, a third segment fixed to said plunger and an intermediate resilient second segment between said first and third segments, said second segment generally perpendicular to said first and third segments, said actuating link being disposed to rotate about an axis substantially parallel to said first segment, and said resiliency of said second segment permitting said second segment to flex in a direction perpendicular to said axis of rotation of said actuating link.

2. The valve of claim 1 wherein
   said plunger has first, second, and third contiguous portions, said first portion secured to said link and offset from and generally parallel to said third portion, said third portion fixed to said actuator and said second portion being resilient and intermediate said first and third portions.

3. The valve of claim 2 wherein said intermediate section has a cross-sectional area approximately equal to that of the remainder of said link.

4. The valve of claim 2 wherein
   said body is molded from a plastic material and has a cup-shaped portion extending from a side thereof, said cup-shaped portion opening away from said first chamber and receiving in sealing engagement therewith said valve actuator,
   said body further including a contiguous wall portion extending from said side and said cup-shaped portion to define a second chamber surrounding said plunger, said second chamber being open at one side thereof.

5. A butterfly valve comprising:
   a. a valve body defining an opening extending therethrough;
   b. a butterfly plate within said opening for controlling fluid flow therethrough;
   c. a valve actuator having a movable diaphragm therein;
   d. actuating means between said valve actuator and said butterfly plate for translating in a yieldable manner linear motion of said valve actuator to rotational movement of said butterfly plate, said actuating means including a plunger rod extending from said valve actuator and a U-shaped actuating link connecting said plunger rod and said butterfly plate;
   e. said actuating link having a first segment secured to said butterfly plate and oriented generally parallel to the axis of rotation of said butterfly plate, a rigid third segment secured to an end of said plunger rod and an intermediate second segment yieldable in a direction perpendicular to the axis of rotation of said butterfly plate; and
   f. said plunger rod having first, second, and third contiguous portions, said first portion generally aligned with the centerline of said valve actuator, said third portion generally parallel to and offset from said first portion and affixed to said diaphragm, and said second portion resiliently extending between said first and second portions.

6. A vacuum actuated, butterfly valve for use in controlling coolant flow to a heater core or the like in an automotive vehicle, said valve comprising:
   a valve body defining an open-ended chamber extending therethrough,
   a vacuum motor secured to said valve body,
   a spring-biased plunger extending from said motor and movable in response to vacuum supplied to said motor, said plunger defined as having first, second, and third contiguous portions, said first portion generally aligned with the longitudinal centerline of said motor, said third portion generally parallel to said first portion and offset laterally therefrom and fixed to the diaphragm of said vacuum motor for common movement therefrom, and said second portion yieldably extending between said first and third portions,
   a butterfly plate within said chamber, and
   an actuating link between said plunger and said plate for transmitting linear motion of said plunger into rotary motion of said plate, said actuating link being defined by first, second, and third contiguous segments, said first segment being secured to said plate for rotation therewith, and being journalled in said valve body, said third segment being affixed to said first portion of said plunger and being generally parallel to and extending in the same direction as said first segment, said second segment being generally perpendicular to said first and third segments and having a generally flat, yieldable configuration, said configuration being defined as generally rectangular in cross section.

* * * * *